United States Patent
Singh et al.

(10) Patent No.: US 11,636,607 B2
(45) Date of Patent: Apr. 25, 2023

(54) COMPUTER VISION SYSTEMS AND METHODS FOR OPTIMIZING CORRELATION CLUSTERING FOR IMAGE SEGMENTATION USING BENDERS DECOMPOSITION

(71) Applicant: Insurance Services Office, Inc., Jersey City, NJ (US)

(72) Inventors: Maneesh Kumar Singh, Lawrenceville, NJ (US); Julian Yarkony, Jersey City, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/132,169

(22) Filed: Dec. 23, 2020

(65) Prior Publication Data

US 2021/0192746 A1    Jun. 24, 2021

Related U.S. Application Data

(60) Provisional application No. 62/952,732, filed on Dec. 23, 2019.

(51) Int. Cl.
*G06K 9/00* (2022.01)
*G06T 7/162* (2017.01)
*G06K 9/62* (2022.01)

(52) U.S. Cl.
CPC ............ *G06T 7/162* (2017.01); *G06K 9/6218* (2013.01)

(58) Field of Classification Search
CPC ........... G06T 7/10; G06T 7/162; G06V 10/26; G06V 10/762; G06V 20/695
See application file for complete search history.

(56) References Cited

U.S. PATENT DOCUMENTS

| | | |
|---|---|---|
| 11,334,827 B1* | 5/2022 | R .......................... G06Q 10/04 |
| 2017/0014642 A1* | 1/2017 | An ........................ A61N 5/1031 |
| 2021/0192746 A1* | 6/2021 | Singh ................... G06V 20/695 |

OTHER PUBLICATIONS

Kolmogorov, "Convergent Tree-Reweighted Message Passing for Energy Minimization," IEEE Transactions on Pattern Analysis and Machine Intelligence, vol. 28, No. 10, Oct. 2006 (16 pages).
Kolmogorov, "Blossom V: A New Implementation of a Minimum Cost Perfect Matching Algorithm," Mathematical Programming Computation (2009) (25 pages).
Komodakis, et al., "Beyond Loose LP-Relaxations: Optimizing MRs by Repairing Cycles," ECCV 2008 (14 pages).
Komodakis, et al., "MRF Optimization Via Dual Decomposition: Message-Passing Revisited," In 11th International Conference on Computer Vision (ICCV 2007) (8 pages).
(Continued)

*Primary Examiner* — Shervin K Nakhjavan
(74) *Attorney, Agent, or Firm* — McCarter & English, LLP

(57) ABSTRACT

Computer vision systems and methods for optimizing correlation clustering for image segmentation are provided. The system receives input data and generates a correlation clustering formulation for Benders Decomposition for optimized correlation clustering of the input data. The system optimizes the Benders Decomposition for the generated correlation clustering formulation and performs image segmentation using the optimized Benders Decomposition.

18 Claims, 8 Drawing Sheets

(56) References Cited

OTHER PUBLICATIONS

Leal-Taixe, et al., "MOTChallenge 2015: Towards a Benchmark for Multi-Target Tracking," arXiv:1504.01942v1, Apr. 8, 2015 (15 pages).
Leal-Taixe, et al., "Branch-and-Price Global Optimization for Multi-View Multi-Target Tracking," In Computer Vision and Pattern Recognition (CVPR 2012) (8 pages).
Levinkov, et al., "Joint Graph Decomposition and Node Labeling: Problem, Algorithms, Applications," In CVPR (2017) (9 pages).
Lubbecke, et al., "Selected Topics in Column Generation," Operations Research, vol. 53, No. 6 Nov.-Dec. 2005 (20 pages).
Magnanti, et al., "Accelerating Benders Decomposition: Algorithmic Enhancement and Model Selection Criteria," Operations Research, vol. 29 No. 3, May-Jun. 1981 (22 pages).
Mason, et al., "A Nested Column Generator for Solving Rostering Problems with Integer Programming," In International Conference on Optimisation: Techniques and Applications (1998) (8 pages).
Pishchulin, et al., "Deepcut: Joint Subset Partition and Labeling for Multi Person Pose Estimation," In 2016 IEEE Conference on Computer Vision and Pattern Recognition (9 pages).
Ren, et al., "Learning a Classification Model for Segmentation," In Proceedings of the Ninth IEEE International Conference on Computer (2003) (8 pages).
Ronneberger, et al., "U-Net: Convolutional Networks for Biomedical Image Segmentation," In International Conference on Medical Image Computing and Computer-Assisted Intervention (Springer, 2015) (8 pages).
Ropke, et al., "Branch and Cut and Price for the Pickup and Delivery Problem with Time Windows," Transportation Science,vol. 43, No. 3, Aug. 2009 (21 pages).
Rother, et al., "Optimizing Binary MRFs via Extended Roof Duality," In IEEE Conference on Computer Vision and Pattern Recognition (2007) (8 pages).
Rumelhart, et al., "Learning Internal Representations by Error Propagation," Institute for Cognitive Science, University of California, Sep. 1985 (49 pages).
Keerthi, et al., "Constructing a Maximum Utility Slate of On-Line Advertisements," arXiv:0706.1318v1, Jun. 9, 2007 (12 pages).
Shih, et al., "Unifying Maximum Cut and Minimum Cut of a Planar Graph," IEEE Transactions on Computers, vol. 39,, No. 5, May 1990 (4 pages).
Silberman, et al., "Instance Segmentation of Indoor Scenes Using a Coverage Loss," In European Conference on Computer Vision, Springer, 2014 (16 pages).
Sommer, et al., "Ilastik: Interactive Learning and Segmentation Toolkit," In ISBI, 2011 (4 pages).
Sontag, et al., "Efficiently Searching for Frustrated Cycles in MAP Inference," In Proceedings of the Twenty-Eighth Conference on Uncertainty in Arlilicial Intelligence (2012) (10 pages).
Sontag, et al., "Introduction to Dual Decomposition for Inference," Optimization for Machine Learning (2011) (36 pages).
Sontag, et al., "Clusters and Coarse Partitions in LP Relaxations," In Advances in Neural Information Processing Systems (2009) (8 pages).
Sontag, et al., Tightening LP Relaxations for MAP Using Message Passing,: In Proceedings of the Twenty-Fourth Conference Annual Conference on Uncertainty in Artificial Intelligence (2008) (8 pages).
Tang, et al., "Subgraph Decomposition for Multi-Target Tracking," In CVPR, 2015 (9 pages).
Taskar, et al., "Max-Margin Markov Networks," In Advances in Neural Information Processing Systems (2004) (8 pages).
Tsochantaridis, et al., "Large Margin Methods for Structured and Interdependent Output Variables," Journal of Machine Learning Research (2005) (32 pages).
Vance, et al., "A Heuristic Branch-and-Price Approach for the Airline Crew Pairing Problem," Preprint, 1997 (29 pages).
Wang, et al., "Learning Optimal Parameters for Multi-Target Tracking," In British Machine Vision Conference (2015) (13 pages).
Wang, et al., "Accelerating Dynamic Programs via Nested Benders Decomposition with Application to Multi-Person Pose Estimation," In Proceedings of the European Conference on Computer Vision (ECCV) (2018) (15 pages).
Wang, et al., "Exploiting Skeletal Structure in Computer Vision Annotation with Benders Decomposition," arXiv:1709.04411v1, Sep. 13, 2017 (13 pages).
Wang, et al., "Efficient Multi-Person Pose Estimation with Provable Guarantees," arXiv:1711.07794v1, Nov. 21, 2017 (11 pages).
Wang, et al., "Tracking Objects with Higher Order Interactions via Delayed Column Generation," In Artificial Intelligence and Statistics (2017) (9 pages).
Wang, et al., "Multi-Person Pose Estimation via Column Generation," arXiv: 1709.05982v1, Sep. 18, 2017 (12 pages).
Welling, "Herding Dynamical Weights to Learn," In Proceedings of the 26th Annual International Conference on Machine Learning (2009) (8 pages).
Yang, et al., "Articulated Pose Estimation with Flexible Mixtures-of-Parts," In 2011 IEEE Conference on Computer Vision and Pattern Recognition (CVPR) (2011) (8 pages).
Yarkony, "Next Generation Multicuts for Semi-Planar Graphs," In Proceedings of the Neural Information Processing Systems Optimization in Machine Learning Workshop (2015) (8 pages).
Yarkony, et al., "Parallel Multicut Segmentation via Dual Decomposition," In New Frontiers in Mining Complex Patterns (NFMCP 2014) (13 pages).
Yarkony, et al., "Planar Ultrametrics for Image Segmentation," In Neural Information Processing Systems (2015) (9 pages).
Yarkony, et al., "Covering Trees and Lower-bounds on Quadratic Assignment," In 2010 IEEE Conference on Computer Vision and Pattern Recognition (CVPR 2010) (8 pages).
Yarkony, et al., "Fast Planar Correlation Clustering for Image Segmentation," In Proceedings of the 12th European Conference on Computer Vision (ECCV 2012) (14 pages).
Yarkony, et al., "Accelerating Message Passing for MAP with Benders Decomposition," arXiv:1805.04958v1, May 13, 2018 (26 pages).
Zhang, et al., "Yeast Cell Detection and Segmentation in Bright Field Microscopy," In ISBI, 2014 (4 pages).
Zhang, et al., "Efficient Column Generation for Cell Detection and Segmentation," arXiv: 1709.07337v1, Sep. 21, 2017 (27 pages).
Zhang, et al., "Cell Detection and Segmentation Using Correlation Clustering," In International Conference on Medical Image Computing and Computer-Assisted Intervention (2014) (8 pages).
Zhang, et al., "Global Data Association for Multi-Object Tracking Using Network Flows," In IEEE Conference on Computer Vision and Pattern Recognition (CVPR 2008) (8 pages).
Zhang, et al., "Monocular Object Instance Segmentation and Depth Ordering with CNNs," In Proceedings of the IEEE International Conference on Computer Vision (2015) (9 pages).
Cordeau, et al., "Benders Decomposition for Simultaneous Aircraft Routing and Crew Scheduling," Transportation Science, vol. 35, No. 4, Nov. 2001 (14 pages).
Ford, et al., "Maximal Flow Through a Network," Canadian Journal of Mathematics (1956) (6 pages).
Geoffrion, et al., "Multicommodity Distribution System Design by Benders Decomposition," The Intstitute of Management Science (1974) (24 pages).
Martin, et al., "A Database of Human Segmented Natural Images and Its Application to Evaluating Segmentation Algorithms and Measuring Ecological Statistics," In Proceedings of the Eighth International Conference on Computer Vision (2001) (8 pages).
Nowozin, et al., "Solution Stability in Linear Programming Relaxations: Graph Partitioning and Unsupervised Learning," In Proceedings of the 26th Annual International Conference on Machine Learning (2009) (8 pages).
Andres, et al., "OpenGM: A C++ Library for Discrete Graphical Models," arXiv:1206.0111v1 (2012) (6 pages).
Yarkony, et al., "Data Association via Set Packing for Computer Vision Applications," Informs Journal on Optimization, vol. 2, No. 3 (2020) (25 pages).

(56) References Cited

OTHER PUBLICATIONS

Keuper, et al., "Massively Parallel Benders Decomposition for Correlation Clustering," arXiv:1902.05659v1, Feb. 15, 2019 (18 pages).
José M. Valério de Carvalho, "Using Extra Dual Cuts to Accelerate Column Generation," Informs Journal on Computing, vol. 17, No. 2 (2005) (9 pages).
Yu , et al., "Learning Structural SVMs with Latent Variables," Proceedings of the 26th International Conference on Machine Learning (2009) (4 pages).
Kappes et al., "Higher-Order Segmentation Via Multicuts," arXiv:1305.6387v3, Nov. 16, 2015 (19 pages).
Joncour, et al., "col. Generation Based Primal Heuristics," Electronic Notes in Discrete Mathematics (2010) (8 pages).
Gschwind, et al., "Dual Inequalities for Stabilized Column Generation Revisited," Informs Journal on Computing, vol. 28, No. 1 (2016) (21 pages).
Abrams, et al., "Optimal Delivery of Sponsored Search Advertisements Subject to Budget Constraints," In Proceedings of the 8th ACM Conference on Electronic Commerce (2007) (7 pages).
Andres, et al., "Probabilistic Image Segmentation with Closedness Constraints," In Proceedings of the Fifth International Conference on Computer Vision (2011) (8 pages).
Andres, et al., "Globally Optimal Closed-Surface Segmentation for Connectomics," In Proceedings of the Twelveth International Conference on Computer Vision (ECCV 2012) (14 pages).
Andres, et al., "Segmenting Planar Superpixel Adjacency Graphs w.r.t. Non-Planar Superpixel Affinity Graphs," In Proceedings of the Ninth Conference on Energy Minimization in Computer Vision and Pattern Recognition (EMMCVPR 2013) (14 pages).
Andriluka, et al., "2D Human Pose Estimation: New Benchmark and State of the Art Analysis," In Proceedings of the IEEE Conference on Computer Vision and Pattern Recognition (2014) (8 pages).
Arteta, et al., "Learning to Detect Cells Using Non-Overlapping Extremal regions," In MICCAI (2012) (9 pages).
Arteta, et al., "Detecting Overlapping Instances in Microscopy Images Using Extremal Region Trees," Medical Image Analysis (2016) (14 pages).
Bansal, et al., "Correlation Clustering," In Proceedings of the 43rd Annual IEEE Symposium on Foundation of Computer Science (2002) (10 pages).
Barahona, et al., "Plant Location with Minimum Inventory," Mathematical Programming, 83 (1998) (11 pages).
Barnhart, et al., "Branch-and-Price: Column Generation for Solving Huge Integer Programs," Operations Research, vol. 46, No. 3, May-Jun. 1998 (14 pages).
Bellman, "Dynamic Programming," Princeton Universtiy Press (1957) (365 pages).
Ben Amor, et al., "Dual-Optimal Inequalities for Stabilized Column Generation," Operations Research, vol. 54, No. 3, May-Jun. 2006 (10 pages).
Benders, "Partitioning Procedures for Solving Mixed-Variables Programming Problem," Numerische Mathematik 4, (1962) (15 pages).
Bernardin, et al., "Evaluating Multiple Object Tracking Performance: The Clear MOT Metrics," Journal on Image Video Processing (2008) (10 pages).
Birge, "Decomposition and Partitioning Methods for Multistage Stochastic Linear Programs," Operations Research, vol. 33, No. 5, Sep.-Oct. 1985 (19 pages).
Boykov, et al., "An Experimental Comparison of Min-Cut/Max-Flow Algorithms for Energy Minimization in Vision," IEEE Transactions on Pattern Analysis and Machine Intelligence, vol. 26, No. 9, Sep. 2004 (14 pages).
Boykov, et al., "Fast Approximate Energy Minimization via Graph Cuts," IEEE Transactions on Pattern Analysis and Machine Intelligence, vol. 23, No. 11, Nov. 2001 (18 pages).
Butt, et al., "Multi-Target Tracking by Lagrangian Relaxation to Min-Cost Network Flow," In 2013 IEEE Conference on Computer Vision and Pattern (8 pages).
Chen, et al., "Integrating Local Classifiers Through Nonlinear Dynamics on Label Graphs with an Application to Image Segmentation," In 2011 IEEE International Conference on Computer Vision (8 pages).
Dalal, et al., "Histograms of Oriented Gradients for Human Detection," In Proceedings of the 2005 IEEE Computer Society Conference on Computer Vision and Pattern Recognition (8 pages).
Dell' Amico, et al., "A Branch-and-Price Approach to the Vehicle Routing Problem with Simultaneous Distribution and Collection," Transportation Science, vol. 40, No. 2, May 2006 (14 pages).
Deng, et al., "ImageNet: A Large-Scale Hierarchical Image Database," In Computer Vision and Pattern Recognition (2009) (8 pages).
Desai, et al., "Discriminative Models for Multi-Class Object Layout," International Journal of Computer Vision (2011) (12 pages).
Desaulniers, et al., "A Unified Framework for Deterministic Time Constrained Vehicle Routing and Crew Scheduling Problems," In Fleet Management and Logistics (1998) (37 pages).
Desrosiers, et al., "A Primer in Column Generation," In Column Generation (2005) (32 pages).
Dimopoulos, et al., "Accurate Cell Segmentation in Microscopy Images Using Membrane Patterns," Bioinformatics, vol. 30, No. 18 (2014) (8 pages).
Felzenszwalb, et al., "A Discriminatively Trained, Multiscale, Deformable Part Mode,". In Computer Vision and Pattern Recognition (2008) (8 pages).
Felzenszwalb, et al., "Object Detection with Discriminatively Trained Part-Based Models," IEEE Transactions on Pattern Analysis and Machine Intelligence, vol. 32, No. 9, Sep. 2010 (19 pages).
Finley, et al., "Training Structural SVMs When Exact Inference is Intractable," In Proceedings of the 25th International Conference on Machine Learning (2008) (8 pages).
Fisher, "On the Dimer Solution of Planar Ising Models," Journal of Mathematical Physics (1966) (7 pages).
Fukasawa, et al., "Robust Branch-and-Cut-and-Price for the Capacitated Vehicle Routing Problem," Mathematical Programming (2006) (21 pages).
Funke, et al., "Learning to Segment: Training Hierarchical Segmentation Under a Topological Loss," In MICCAI (2015) (8 pages).
Geoffrion, "Lagrangean Relaxation for Integer Programming," In Approaches to Integer Programming (1974) (35 pages).
Gilmore, et al., "A Linear Programming Approach to the Cutting-Stock Problem," Operations Research, vol. 9, No. 6, Nov.-Dec. 1961 (12 pages).
Gilmore, et al., "Multistage Cutting Stock Problems of Two and More Dimensions," Operations Research, vol. 13, No. 1, Jan.-Feb. 1965 (28 pages).
Heismann, et al., "A Generalization of Odd Set Inequalities for the Set Packing Problem," In Operations Research Proceedings (2013) (7 pages).
Hilsenbeck, et al., "fastER : A User-Friendly Tool for Ultrafast and Robust Cell Segmentation in Large-Scale Microscopy," Bioinformatics (2017) (9 pages).
Insafutdinov, et al., "DeeperCut: A Deeper, Stronger, and Faster Multi-Person Pose Estimation Model," In ECCV (2016) (17 pages).
Jepsen, et al., "Subset-Row Inequalities Applied to the Vehicle-Routing Problem with Time Windows," Operations Research (2008) (16 pages).
Karp, "Reducibility Among Combinatorial Problems," In Complexity of Computer Computations (1972) (19 pages).
Keuper, et al.,"Motion Trajectory Segmentation Via Minimum Cost Multicuts," In ICCV (2015) (9 pages).
Keuper, et al., "Efficient Decomposition of Image and Mesh Graphs by Lifted Multicuts," In ICCV (2015) (9 pages).
Kim, et al., "Higher-Order Correlation Clustering for Image Segmentation," In Advances in Neural Information Processing Systems (2011) (9 pages).

\* cited by examiner

Algorithm 1 Benders Decomposition for CC (BDCC)

1: $\hat{Z} \leftarrow \{\}$
2: done_LP $\leftarrow$ False
3: repeat
4:      $x \leftarrow$ Solve Eq 8 over $\hat{Z}$ enforcing integrality if and only if done_LP=True
5:      did_add $\leftarrow$ False
6:      for $n \in N$ do
7:         if $\exists (d_1, d_2) \in \mathcal{E}_n^-$ s.t. $Dist(d_1, d_2) < x_{d_1 d_2}$ then
8:             $z_1 \leftarrow$ Get Benders row via Eq 7
9:             $z_2 \leftarrow$ Get MWR via Section 5.
10:            $\hat{Z} \leftarrow \hat{Z} \cup z_1, z_2$
11:            did_add $\leftarrow$ True
12:         end if
13:      end for
14:      if did_add=False then
15:         done_LP $\leftarrow$ True
16:      end if
17: Until did_add=False AND $x_{d_1 d_2} \in \{0,1\} \forall (d_1, d_2) \in \mathcal{E}$
18: Return $x$

FIG. 3

| $\epsilon=0.1$ | $\nu$ | par | 10 | 50 | 100 | 300 |
|---|---|---|---|---|---|---|
| | 0.5 | 0 | 0.149 | 0.372 | 0.585 | 0.894 |
| | 0 | 1 | 0.0106 | 0.0532 | 0.0745 | 0.106 |
| | 0.5 | 0 | 0.266 | 0.777 | 0.904 | 0.968 |
| | 0 | 1 | 0.0426 | 0.0745 | 0.0745 | 0.138 |
| $\epsilon=1$ | $\nu$ | par | 10 | 50 | 100 | 300 |
| | 0.5 | 0 | 0.149 | 0.394 | 0.606 | 0.904 |
| | 0 | 1 | 0.0106 | 0.0638 | 0.0745 | 0.16 |
| | 0.5 | 0 | 0.319 | 0.819 | 0.947 | 0.979 |
| | 0 | 1 | 0.0532 | 0.0745 | 0.106 | 0.17 |
| $\epsilon=10$ | $\nu$ | par | 10 | 50 | 100 | 300 |
| | 0.5 | 0 | 0.202 | 0.426 | 0.628 | 0.915 |
| | 0 | 1 | 0.0532 | 0.0957 | 0.128 | 0.223 |
| | 0.5 | 0 | 0.447 | 0.936 | 0.979 | 0.989 |
| | 0 | 1 | 0.0638 | 0.128 | 0.181 | 0.287 |

FIG. 6

Algorithm 2 Generating an Integral and Feasible Solution Given Infeasible and or Non-Integral Input $x*$)

1: $x^+_{d_1 d_2} \leftarrow 0 \quad \forall (d_1, d_2) \in \mathcal{E}$

2: $k_{d_1 d_2} \leftarrow \phi_{d_1 d_2} x^*_{d_1 d_2} \quad \forall (d_1, d_2) \in \mathcal{E}^-$ 3: $k_{d_1 d_2} \leftarrow \phi_{d_1 d_2} (1 - x^*_{d_1 d_2}) \quad \forall (d_1, d_2) \in \mathcal{E}^+$ 4: for $n \in N$ do

5: $\quad x^n \leftarrow$ minimizer for $Q(k, n, x^{0n})$ given fixed $k, n$.

6: $\quad x^+_{d_1 d_2} \leftarrow \max(x^+_{d_1 d_2}, x^n_{d_1 d_2}) \quad \forall (d_1, d_2) \in \mathcal{E}$ 7: $\quad k_{d_1 d_2} \leftarrow k_{d_1 d_2}(1 - x^+_{d_1 d_2}) \quad \forall (d_1, d_2) \in \mathcal{E}$ 8: end for

9: Return $x^+$

FIG. 7

COMPUTER VISION SYSTEMS AND METHODS FOR OPTIMIZING CORRELATION CLUSTERING FOR IMAGE SEGMENTATION USING BENDERS DECOMPOSITION

RELATED APPLICATIONS

This application claims priority to U.S. Provisional Patent Application Ser. No. 62/952,732 filed on Dec. 23, 2019, the entire disclosure of which is hereby expressly incorporated by reference.

BACKGROUND

Technical Field

The present disclosure relates generally to the field of computer vision technology. More specifically, the present disclosure relates to computer vision systems and methods for optimizing correlation clustering for image segmentation using Benders decomposition.

Related Art

Many computer vision tasks involve partitioning (clustering) a set of observations into unique entities. A powerful formulation for such tasks, is that of (weighted) correlation clustering. Correlation clustering is defined on a sparse graph with real valued edge weights, where nodes correspond to observations, and weighted edges describe the affinity between pairs of nodes. For example, in image segmentation on superpixel graphs, nodes correspond to superpixels, and edges indicate adjacency between the superpixels. The weight of the edge between a pair of superpixels relates to the probability, as defined by a classifier, that the two superpixels belong to the same ground truth entity. The weight is positive if the probability is greater than ½, and negative if the probability is less than ½. The magnitude of the weight is a function of the confidence of the classifier.

The correlation clustering cost function sums up the weights of the edges separating connected components, referred to as entities, in a proposed partitioning of the graph. Optimization in correlation clustering partitions the graph into entities so as to minimize the correlation clustering cost. Correlation clustering is appealing since the optimal number of entities emerges naturally as a function of the edge weights rather than requiring an additional search over some model order parameter describing the number of clusters (entities).

Optimization in correlation clustering is non-deterministic polynomial-time hard ("NP-hard") for general graphs. Common approaches for optimization in correlation clustering, which are based on linear programming, do not scale easily due to large correlation clustering problem instances. Therefore, there is a need for computer vision systems and methods which can accelerate optimization in correlation clustering in computer visions systems, thereby improving the ability of computer vision systems to more efficiently employ an efficient mechanism for optimization in correlation clustering for domains, where massively parallel computation can be exploited. These and other needs are addressed by the computer vision systems and methods of the present disclosure.

SUMMARY

The present disclosure relates to computer vision systems and methods for optimizing correlation clustering for image segmentation using Benders decomposition. The present disclosure discusses a system capable of applying Benders decomposition from operations research to correlation clustering for computer vision. Benders decomposition is commonly applied in operations research to solve mixed integer linear programs ("MILP") that have a special, but common, block structure. Benders decomposition receives a partition of the variables in the MILP between a master problem and a set of subproblems. The block structure requires that no row of the constraint matrix of the MILP contains variables from more than one subproblem. Variables explicitly enforced to be integral lie in the master problem.

The system achieves optimization in Benders decomposition using a cutting plane algorithm. Optimization proceeds with the master problem solving optimization over its variables, followed by solving the subproblems in parallel, providing primal/dual solutions over their variables conditioned on the solution to the master problem. The dual solutions to the subproblems provide constraints to the master problem. Optimization continues until no further constraints are added to the master problem. The system then accelerates Benders decomposition using the seminal operations research technique of Magnanti-Wong Benders rows ("MWR"). The system generates MWR by solving the Benders subproblems with a distinct objective under the hard constraint of optimality regarding the original subproblem objective. As such, in contrast to classic approaches to correlation clustering, the system allows for massive parallelization.

BRIEF DESCRIPTION OF THE DRAWINGS

The foregoing features of the invention will be apparent from the following Detailed Description of the Invention, taken in connection with the accompanying drawings, in which:

FIG. 3 is an algorithm showing the cutting plane approach for generating Benders decomposition for correlation clustering, as described in connection with FIG. 2;

FIG. 6 is a table showing the convergence of bounds for different optimal parameters of the present disclosure;

FIG. 7 depicts an algorithm showing the serial rounding procedure of the present disclosure.

DETAILED DESCRIPTION

Figure 1:
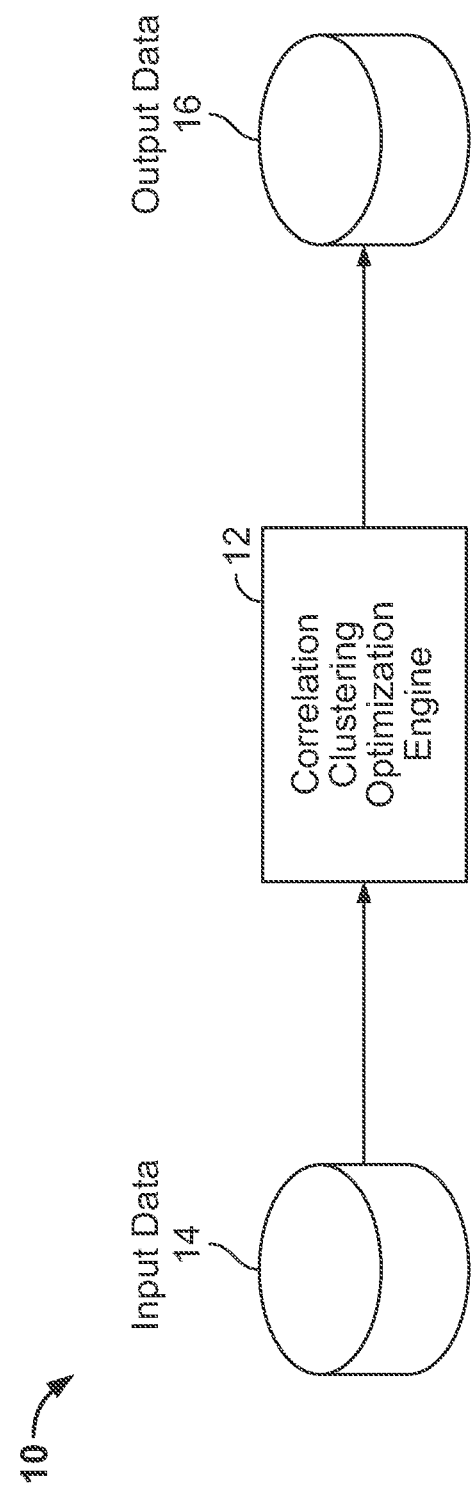
FIG. 1 is a diagram illustrating overall system of the present disclosure.

The present disclosure relates to computer vision systems and methods for optimizing correlation clustering for image segmentation using Benders decomposition, as described in detail below in connection with FIGS. 1-8. By way of background and before describing the systems and methods of the present disclosure in detail, the standard correlation clustering formulation will be discussed first.

The standard formulation for correlation clustering corresponds to a graph partitioning problem with respect to graph $G'=(\mathcal{D}, \mathcal{E})$. This problem is defined by Equations 1 and 2, as follows:

$$\min_{\substack{x_{d_1 d_2} \in \{0,1\} \\ \forall d_1 d_2 \in \mathcal{E}}} \sum_{d_1 d_2 \in \mathcal{E}^-} -\phi_{d_1 d_2}(1 - x_{d_1 d_2}) + \sum_{d_1 d_2 \in \mathcal{E}^+} \phi_{d_1 d_2} x_{d_1 d_2} \quad \text{Equation 1}$$

$$\text{s.t.} \sum_{d_1 d_2 \in \mathcal{E}_c^+} x_{d_1 d_2} \geq x_{d_1^c d_2^c} \quad \forall c \in C \quad \text{Equation 2}$$

Where the variables are defined as:

$d \in \mathcal{D}$: The set of nodes in the graph, which correlation clustering is applied on, is denoted $\mathcal{D}$ and indexed by d.

$(d_1, d_2) \in \mathcal{E}$: The set of undirected edges in the graph, which correlation clustering is applied on is denoted $\mathcal{E}$, and indexed by nodes $d_1$, $d_2$. The graph described by $\mathcal{E}$ is sparse for real problems.

$x_{d_1 d_2} \in \{0, 1\}$: $x_{d_1 d_2}=1$ to indicate that nodes $d_1$, $d_2$ are in separate components, and zero otherwise. $(d_1, d_2)$ is referred to as an edge, where $x_{d_1 d_2}=1$ as a cut edge.

$\phi_{d_1 d_2} \in \mathbb{R}$: $\phi_{d_1 d_2}$ denotes the weight associated with edge $(d_1, d_2)$. $\mathcal{E}^+$, $\mathcal{E}^-$ denotes the subsets of $\mathcal{E}$, for which $\phi_{d_1 d_2}$ is non-negative, and negative respectively.

$c \in C$: C denotes the set of (undirected) cycles of edges in $\mathcal{E}$, each of which contains exactly one member of $\mathcal{E}^-$. C is indexed with c.

$(d^c_1, d^c_2)$: $(d^c_1, d^c_2)$ denotes the only edge in $\mathcal{E}^-$ associated with cycle c.

$\mathcal{E}_c^+$: $\mathcal{E}_c^+$ denotes the subset of $\mathcal{E}^+$ associated with the cycle c.

The objective in Equation 1 describes the total weight of the cut edges. The constraints described in Equation 2 enforce the standard relaxation of correlation clustering, which requires that transitivity regarding association of nodes with components be respected. Equation 2 can be expressed with the following example. Any cycle of edges "c" contains exactly one edge in $(d^c_1, d^c_2) \in \mathcal{E}^-$. Equation 2 states that if edge $(d^c_1, d^c_2)$ is cut, then at least one other edge must be cut on the cycle. If this constraint is violated, this means $d^c_1$, $d^c_2$ are in separate components (since $x_{d^c_1 d^c_2}=1$), and that all nodes on the cycle are in the same component (since $x_{d_1 d_2}=0$ for all $(d_1, d_2) \in \mathcal{E}_c^+$) creating a contradiction.

The constraints in Equation 2 are referred to as cycle inequalities. Solving Equation 1 is intractable due to the large number of cycle inequalities. To attack such problems, prior art systems iterate between solving an integer linear program ("ILP") over a nascent set of constraints $\hat{C}$ (initialized empty), and adding new constraints from the set of currently violated cycle inequalities. Generating constraints corresponds to iterating over $(d_1, d_2) \in \mathcal{E}^-$, and identifying the shortest path between the $d_1$, $d_2$ in the graph with edges $\mathcal{E}$, and weights equal to the vector x. If the corresponding path has total weight less than $x_{d_1 d_2}$, then the corresponding constraint is added to $\hat{C}$. The linear program relaxation of Equations 1 and 2 can be solved instead of the ILP in each iteration until no violated cycle inequalities exist, after which the ILP is solved in each iteration.

It is noted that in prior art systems, correlation clustering for computer vision did not require that cycle inequalities contain exactly one member of $\mathcal{E}^-$, which is on the right hand side of Equation 2. The addition of cycle inequalities, that contain edges in $\mathcal{E}^-$, $\mathcal{E}^+$ on the left hand side, right hand side of Equation 2, respectively, do not tighten the ILP in Equation 1 and 2 or its linear program relaxation.

The system of the present disclosure reformulates optimization in the ILP to admit efficient optimization via Benders decomposition. Benders decomposition is an exact MLP programming solver, but can be intuitively understood as a coordinate descent procedure, iterating between the master problem, and the subproblems. Solving the subproblems not only provides a solution for their variables, but also a lower bound in the form of a hyper-plane over the master problem's variables. The lower bound is tight at the current solution to the master problem.

This formulation is defined by a minimal vertex cover on $\mathcal{E}^-$, with members $N \subset D$ indexed by n. Each $n \in N$ is associated with a Benders subproblem, and is referred to as the root of that Benders subproblem. Edges in $\mathcal{E}^-$ are partitioned arbitrarily between the subproblems, such that each $(d_1, d_2) \in \mathcal{E}^-$ is associated with either the subproblem with root $d_1$ or the subproblem with root $d_2$. For example, $\mathcal{E}_n^-$ is the subset of $\mathcal{E}^-$ associated with subproblem n. The subproblem with root n enforces the cycle inequalities $C_n$, where $C_n$ is the subset of C containing edges in $\mathcal{E}_n^-$. $\mathcal{E}_n^+$ denotes the subset of $\mathcal{E}^+$ adjacent to n. Byway of example, the system assumes that N is provided. However, those skilled in the art would understand that N can be produced greedily or using an LP/ILP (linear program/integer linear program) solver.

FIG. 1 is a diagram illustrating the system of the present disclosure, indicated generally at 10. The system 10 includes a correlation clustering optimization engine 12 which receives input data 14, processes the data, and generates output data 16 for use in connection with image segmentation. Specifically, as discussed above, correlation clustering is defined on a sparse graph with real valued edge weights, where nodes correspond to observations, and weighted edges describe the affinity between pairs of nodes. Optimization in correlation clustering partitions the graph into entities to minimize the correlation clustering cost. The correlation clustering optimization engine 12 accelerates the optimization for correlation clustering, as will be described in further detail below.

Figure 2:
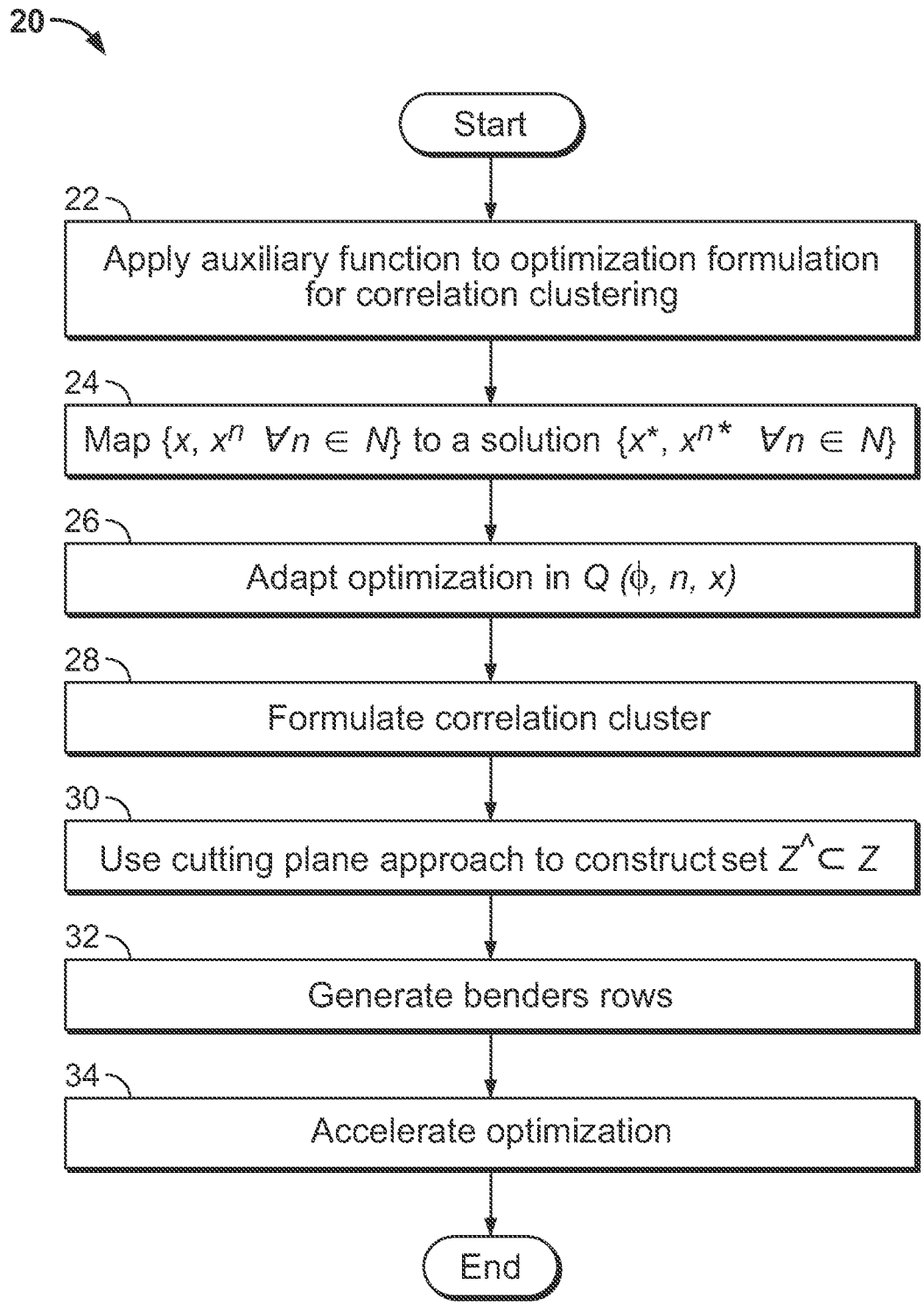
FIG. 2 is a flowchart illustrating overall process steps carried out by the system of the present disclosure.

FIG. 2 is a flowchart illustrating the overall process steps being carried out by the system 10, indicated generally at method 20. In step 22, the system 10 applies an auxiliary function to the optimization formulation for correlation clustering. The auxiliary function can be represented as $Q(\phi, n, x)$, which provides the cost to alter x to satisfy all cycle inequalities in $C_n$, by increasing/decreasing $x_{d_1 d_2}$ for $(d_1, d_2)$ in $\mathcal{E}^+/\mathcal{E}_n^-$, respectively. Equations 3 and 4 below describe the changes to x using $x^n$, which is indexed as x.

$$\text{Eq 1} = \min_{x_{d_1 d_2} \in \{0,1\}} \sum_{d_1 d_2 \in \mathcal{E}^-} -\phi_{d_1 d_2}(1 - x_{d_1 d_2}) + \sum_{d_1 d_2 \in \mathcal{E}^+} \phi_{d_1 d_2} x_{d_1 d_2} + \sum_{n \in N} Q(\phi, n, x) \quad \text{Equation 3}$$

Where $Q(\phi, n, x) =$ $$\min_{x^n_{d_1 d_2} \in \{0,1\}} \sum_{d_1 d_2 \in \mathcal{E}_n^-} -\phi_{d_1 d_2}(1 - x^n_{d_1 d_2}) + \sum_{d_1 d_2 \in \mathcal{E}^+} \phi_{d_1 d_2} x^n_{d_1 d_2} \quad \text{Equation 4}$$

$$\text{s.t.} \sum_{d_1 d_2 \in \mathcal{E}_c^+} x_{d_1 d_2} + x^n_{d_1 d_2} \geq x_{d_1^c d_2^c} - (1 - x^n_{d_1^c d_2^c}) \quad \forall c \in C_n$$

In step 24, the system 10 maps $\{x, x^n \; \forall n \in N\}$ to a solution $\{x^*, x^{n*} \; \forall n \in N\}$, where $x^*$ satisfies all cycle inequalities by construction, without increasing the cost according to Equation 3. The system 10 defines x* as seen below in Equation 5:

$$x^*_{d_1 d_2} \leftarrow \min(x_{d_1 d_2}, x^n_{d_1 d_2}) \quad \forall (d_1, d_2) \in \varepsilon_n^-, n \in \mathcal{N} \quad \text{Equation 5}$$

$$x^*_{d_1 d_A} \leftarrow x_{d_1 d_2} + \max_{n \in \mathcal{N}} x^n_{d_1 d_2} \quad \forall (d_1, d_2) \in \varepsilon^+$$

Given x*, the optimizing solution to each Benders subproblem, n is denoted x"*, and defined as follows. The system 10 sets $x''^*_{d_1 d_2} = 1$, if $(d_1, d_2) \in \mathcal{E}_n^-$, and otherwise set to zero. It is noted that cost of $\{x^*, x''^* \forall n \in N\}$, is no greater than that of $\{x, x'' \forall n \in N\}$, with regard to the objective in Equation 3. It is further noted that $Q(\phi, n, x^*)=0$ for all $n \in N$. Thus there always exists an optimizing solution to Equation 3 denoted x, such that $Q(\phi, n, x)=0$ for all $n \in i$. Further, there exists an optimal partition x", in Equation 4, that is 2-colorable. This is because any partition x", can be altered without increasing its cost, by merging adjacent connected components not including the root node n. It is noted that merging any pair of such components does not increase the cost, since those components are not separated by negative weight edges.

In step 26, the system 10 adapts optimization in Q ($\phi$, n, x). For example, the system 10 can use the node labeling formulation of min-cut, which is expressed by the following notation:

$m_d = 1$ for $d \in \mathcal{D}$: indicates that a node d is not in the component associated with n, and is otherwise zero. To avoid extra notation $m_n$ is replaced by 0.

$f_{d_1 d_2} = 1$ for $(d_1, d_2) \in \mathcal{E}^+$: indicates that the edge between $d_1, d_2$ is cut, but is not cut in x. Thus a penalty of $\phi_{d_1 d_2}$ is added to Q($\phi$, n, x). It is observed that $x''_{d_1 d_2} = f_{d_1 d_2}$ for all $(d_1, d_2) \in \mathcal{E}^+$ $f_{d_1 d_2} = 1$ for $(d_1, d_2) \in \mathcal{E}_n^-$: indicates that the edge between $d_1, d_2$ is not cut, but is cut in x. Thus a penalty of $-\phi_{d_1 d_2}$ is added to Q($\phi$, n, x). Observe that $x''_{d_1 d_2} = 1 - f_{d_1 d_2}$ for all $(d_1, d_2) \in \mathcal{E}_n^-$.

For benefit of readability, the edges are re-oriented from (d, n) to (n, d)

The system 10 then expresses Q($\phi$, n, x) (as expressed by Equation 6, below) as a primal/dual linear program, with primal constraints associated with dual variables $\psi$, $\lambda$, which are noted in the primal. Given a binary x, the system 10 enforces that parameters f, m are non-negative to ensure that there is an optimizing solution for the parameter f, m that is binary. This is a consequence of optimization being total unimodular, given that x is binary. Total unimodularity is a known property of the min-cut/max flop linear program.

$$Q(\phi, n, x) = \min_{\substack{f_{d_1 d_2} \geq 0 \\ m_d \geq 0}} \sum_{d_1 d_2 \in \varepsilon^+} \phi_{d_1 d_2} f_{d_1 d_2} - \sum_{nd \in \varepsilon_n^-} \phi_{nd} f_{nd} \quad \text{Equation 6}$$

$$m_{d_1} - m_{d_2} \leq x_{d_1 d_2} + f_{d_1 d_2} \quad \forall (d_1, d_2) \in (\varepsilon^+ - \varepsilon_n^+), \lambda^1_{d_1 d_2}$$

$$m_{d_2} - m_{d_1} \leq x_{d_1 d_2} + f_{d_1 d_2} \quad \forall (d_1, d_2) \in (\varepsilon^+ - \varepsilon_n^+), \lambda^2_{d_1 d_2}$$

$$x_{nd} - f_{nd} \leq m_d \quad \forall (n, d) \in \varepsilon_n^-, \psi^-_d$$

$$m_d \leq x_{nd} + f_{nd} \quad \forall (n, d) \in \varepsilon_n^+, \psi^+_d$$

In Equation 7, below, the system 10 denotes the binary indicator function, which returns one if the statement is true and zero otherwise.

$$Q(\phi, n, x) = \max_{\substack{\lambda \geq 0 \\ \psi \geq 0}} - \sum_{d_1 d_2 \in (\varepsilon^+ - \varepsilon_n^+)} (\lambda^1_{d_1 d_2} + \lambda^2_{d_1 d_2}) x_{d_1 d_2} + \quad \text{Equation 7}$$

$$\sum_{nd \in \varepsilon_n^-} \psi^-_d x_{nd} - \sum_{nd \in \varepsilon_n^+} \psi^+_d x_{nd}$$

s.t. $\psi^+_{d_1} [(n, d_1) \in \varepsilon_n^+] - $ $\psi^-_{d_1} [(n, d_1) \in \varepsilon_n^-] + \sum_{\substack{d_2 \\ d_1 d_2 \in \varepsilon^+ - \varepsilon_n^+}} (\lambda^-_{d_1 d_2} - \lambda^+_{d_1 d_2}) + $ $\sum_{\substack{d_2 \\ d_2 d_1 \in \varepsilon^+ - \varepsilon_n^+}} (\lambda^+_{d_2 d_1} - \lambda^-_{d_2 d_1}) \geq 0 \quad \forall d_1 \in \mathcal{D} - n$ $-\phi_{nd} - \psi^-_d \geq 0 \quad \forall (n, d) \in \varepsilon_n^-$ $\phi_{nd} - \psi^+_d \geq 0 \quad \forall (n, d) \in \varepsilon_n^+$ $\phi_{d_1 d_2} - \lambda^1_{d_1 d_2} - \lambda^2_{d_1 d_2} \geq 0 \quad \forall (d_1, d_2) \in \varepsilon - \varepsilon_n^+ - \varepsilon_n^-$ In an example, the system 10 considers the constraint that Q ($\phi$, n, x)=0. It is observed that any dual feasible solution ($\lambda$, $\psi$ in Equation 7) describes an affine function of x, that is a lower bound on Q($\phi$, n, x). The system 10 compacts the terms $\lambda$ and $\psi$ into $\omega^z$, where $\omega^z_{d_1 d_2}$ is associated with the term $x_{d_1 d_2}$, as expressed below Equations 8-11:

$\omega_{d_1 d_2}^z = -(\lambda^1_{d_1 d_2} + \lambda^2_{d_1 d_2})$ if $(d_1, d_2) \in \mathcal{E}^+ - \mathcal{E}_n^+$ $\omega_{d_1 d_2}^z = -\psi^+_{d_2}$ if $(d_1, d_2) \in \mathcal{E}_n^+$ $\omega_{d_1 d_2}^z = \psi^-_{d_2}$ if $(d_1, d_2) \in \mathcal{E}_n^-$ $\omega_{d_1 d_2}^z = 0$ if $(d_1, d_2) \in \mathcal{E}^- - \mathcal{E}_n^-$ Equations 8-11, respectively In step 28, the system 10 formulates the correlation cluster. Specifically, the set of all dual feasible solutions is denoted across $n \in N$ as Z, which is indexed by the term z. It is observed that to enforce Q ($\phi$, n, x)=0, it is sufficient to require that $0 \geq \sum_{d_1 d_2 \in E} x_{d_1 d_2} \omega^z_{d_1 d_2}$, for all $z \in Z$. As such, the system 10 formulates the correlation cluster CC as an optimization using Z, as expressed below in Equation 12:

Equation 3 =

$$\min_{x_{d_1 d_2} \in \{0,1\}} \sum_{d_1 d_2 \in \varepsilon^+} \phi_{d_1 d_2} x_{d_1 d_2} - \sum_{d_1 d_2 \in \varepsilon^-} (1 - x_{d_1 d_2}) \phi_{d_1 d_2} \quad \text{Equation 12}$$

s.t. $0 \geq \sum_{d_1 d_2 \in \varepsilon} x_{d_1 d_2} \omega^z_{d_1 d_2} \quad \forall z \in \mathcal{Z}$ It is noted that optimization in Equation 12 is intractable, since |Z| equals the number of dual feasible solutions across subproblems, which is infinite. Since the system 10 cannot consider the entire set Z, in step 30, the system 10 uses a cutting plane approach to construct a set $\hat{Z} \in Z$, that is sufficient to solve Equation 12. Specifically, the system 10 initializes $\hat{Z}$ as the empty set and iterates between solving the LP relaxation of Equation 12 over $\hat{Z}$ (referred to herein as the master problem), and generating new Benders rows until no violated constraints exist. This ensures that no violated cycle inequalities exist, but may not ensure that x in integral. To enforce integrality, the system 10 iterates between solving the ILP in Equation 12 over $\hat{Z}$, and adding Benders rows to $\hat{Z}$. By solving the LP relaxation first, we avoid unnecessary and expensive calls to the ILP solver.

In step 32, the system 10 generates Benders rows. Specifically, in Benders decomposition, the variable of the original problem are divided into two subsets so that a first-stage master problem is solved over the first set variables, and the values for the second set of variables are determined in a second-stage subproblem for a given first-stage solution. If the subproblem determines that the fixed first-stage decisions are infeasible, then cuts are generated and added to the master problem, which is then resolved until no cuts can be generated. The new constraints added by Benders decomposition as it progresses towards a solution are called Benders rows.

More specifically, given x, the system 10 iterates over N, and generate one Benders row using Equation 7, if n is associated with a violated cycle inequality. The system 10 determines if n is associated with a violated cycle inequality as follows. Given n, x the system 10 iterates over $(d_1, d_2) \in \mathcal{E}_n^-$. The system 10 then finds the shortest path from $d_1$ to $d_2$ on graph $\mathcal{E}$, with weights equal to vector x. If the length of this path, denoted as Dist($d_1, d_2$), is less than $x_{d_1d_2}$, then the system 10 identified a violated cycle inequality associated with n.

FIG. 3 is an algorithm showing the cutting plane approach of the present disclosure, (referred to as Benders decomposition for correlation clustering, as described above in connection to method 20. Specifically, the algorithm of FIG. 3 shows the following steps. In line 1, the system 10 initializes the nascent set of Benders rows $\hat{Z}$ to an empty set. In line 2, the system 10 indicates that the system 10 has not solved the LP (linear program) relaxation yet. In lines 3-17, the system 10 alternates between solving the master problem, and generating Benders rows, until a feasible integral solution is produced. More specifically, in line 4, the system 10 solves the master problem by providing a solution x, which may not satisfy all cycle inequalities. The system 10 enforces integrality if the system 10 finished solving the LP relaxation, which is indicated by done_lp=True. In line 5, the system 10 indicates that the system 10 has not yet added any Benders rows this iteration. In lines 6-13, the system 10 adds Benders rows by iterating over subproblems, and adding Benders rows, corresponding to subproblems, associated with violated cycle inequalities. Specifically, In line 7, the system 10 checks if there exists a violated cycle inequality associated $\mathcal{E}_n^-$, which is executed by iterating over $(d_1, d_2) \in \mathcal{E}_n^-$, and checking if the shortest path from $d_1$ to $d_2$ is less than $x_{d_1d_2}$. This distance is defined on graph $\mathcal{E}$ with weights equal to x. In lines 8-10, the system 10 generates Benders rows associated with subproblem n, and add them to nascent set $\hat{Z}$. In line 11, the system 10 indicates that a Benders row was added the iteration. In lines 14-16, the system 10 instructs that if no Benders rows were added the iteration, then the system 10 enforces integrality on x, when solving the master problem for the remainder of the algorithm. Finally, in line 18, the system 10 returns solution x.

Prior to the termination of the algorithm of FIG. 3, the system 10 can produce a feasible integer solution x*, from any solution x, provided by the master problem. For example, for each $(d_1, d_2) \in \mathcal{E}$, set $x^{}_{d_1d_2}=1$, if $x_{d_1d_2}>\frac{1}{2}$, and otherwise set $x^{}_{d_1d_2}=0$. Second for each $(d_1, d_2) \in \mathcal{E}$, set $x^*_{d_1d_2}=1$, if $d_1, d_2$ are in separate connected components of the solution described by x**, and otherwise set $x^*_{d_1d_2}=0$. The cost of the feasible integer solution x*, provides an upper bound on the cost of the optimal solution. A more sophisticated approach for producing feasible integer solutions will be discussed below.

Returning to FIG. 2, in step 34, the system 10 accelerates the optimization (e.g., the Benders Decomposition). In an example, the system 10 accelerates the Benders Decomposition using an operation research technique of Magnanti-Wong Benders row ("MWR"). Specifically, the Benders row, as discussed above in Equation 7, provides a tight bound at x*, where x* is the master problem solution used to generate the Benders row. However, it is desirable that the Benders row provide good lower bounds for a large set of x different from x*, while being tight (or perhaps very active) at x*. To achieve this, the system 10 uses a modified version of Equation 7, where the objective is replaced, and one additional constraint is added.

The system 10 uses a random negative valued vector (with unit norm) in place of the objective Equation 7. The random vector is unique each time a Benders subproblem is solved. In an example, the system 10 uses an objective of $-1/(0.0001+|\phi_{d_1d_2}|)$, which encourages the cutting of edges with large positive weight, but it works as well as the random negative objective. Here, 0.0001 is a tiny positive number used to ensure that the terms in the objective do not become infinite.

The system 10 uses Equation 13, below, to enforce that the new Benders row is active at x*, by requiring that the dual cost is within a tolerance $v \in (0, 1)$ of the optimal with regards to the objective in Equation 7 (hereafter parameter v will be referred to as an optimal parameter).

$$vQ(\phi, n, x) \leq - \sum_{d_1d_2 \in (\varepsilon^+ - \varepsilon_n^+)} (\lambda^1_{d_1d_2} + \lambda^2_{d_1d_2})x_{d_1d_2} + \sum_{nd \in \varepsilon_n^-} \psi_d^- x_{nd} - \sum_{nd \in \varepsilon_n^+} \psi_d^+ x_{nd} \qquad \text{Equation 13}$$

Specifically, v=1 requires optimality with respect to the objective in Equation 7, and v=0 ignores optimality. By way of example, v=½, provides strong performance.

Testing and analysis of the above systems and methods will now be discussed in greater detail. The system of the present disclosure was applied to on the benchmark Berkeley Segmentation Data Set ("BSDS"). The experiments demonstrate the following: 1) the system solves correlation clustering instances for image segmentation; 2) the system successfully exploits parallelization; and 3) the system dramatically accelerates optimization.

To benchmark performance, cost terms are used provided by the OPENGM2 dataset for BSDS. This allows for a direct comparison of the results of the system of the present disclosure to a benchmark. The present system used the random unit norm negative valued objective when generating MWR. The present system further used the IBM ILOG CPLEX Optimization Studio ("CPLEX") to solve all linear and integer linear programming problems considered during the course of optimization. A maximum total CPU time of 600 seconds was used, for each problem instance (regardless of parallelization).

The selection of N was formulated as a minimum vertex cover problem, where for every edge $(d_1, d_2) \in \mathcal{E}^-$, at least one of $d_1, d_2$ is in N. The present system solved for the minimum vertex cover exactly as an ILP. Given N, edges are assigned in $\mathcal{E}^-$ to a connected selected node in N arbitrarily. It is noted that solving for the minimum vertex cover consumed negligible CPU time for the data set. This can be attributed to the structure of the problem domain, since the minimum vertex cover is an NP-hard problem. For problem instances where solving for the minimum vertex cover exactly is difficult, the minimum vertex cover problem can be solved approximately or greedily.

Figure 4:
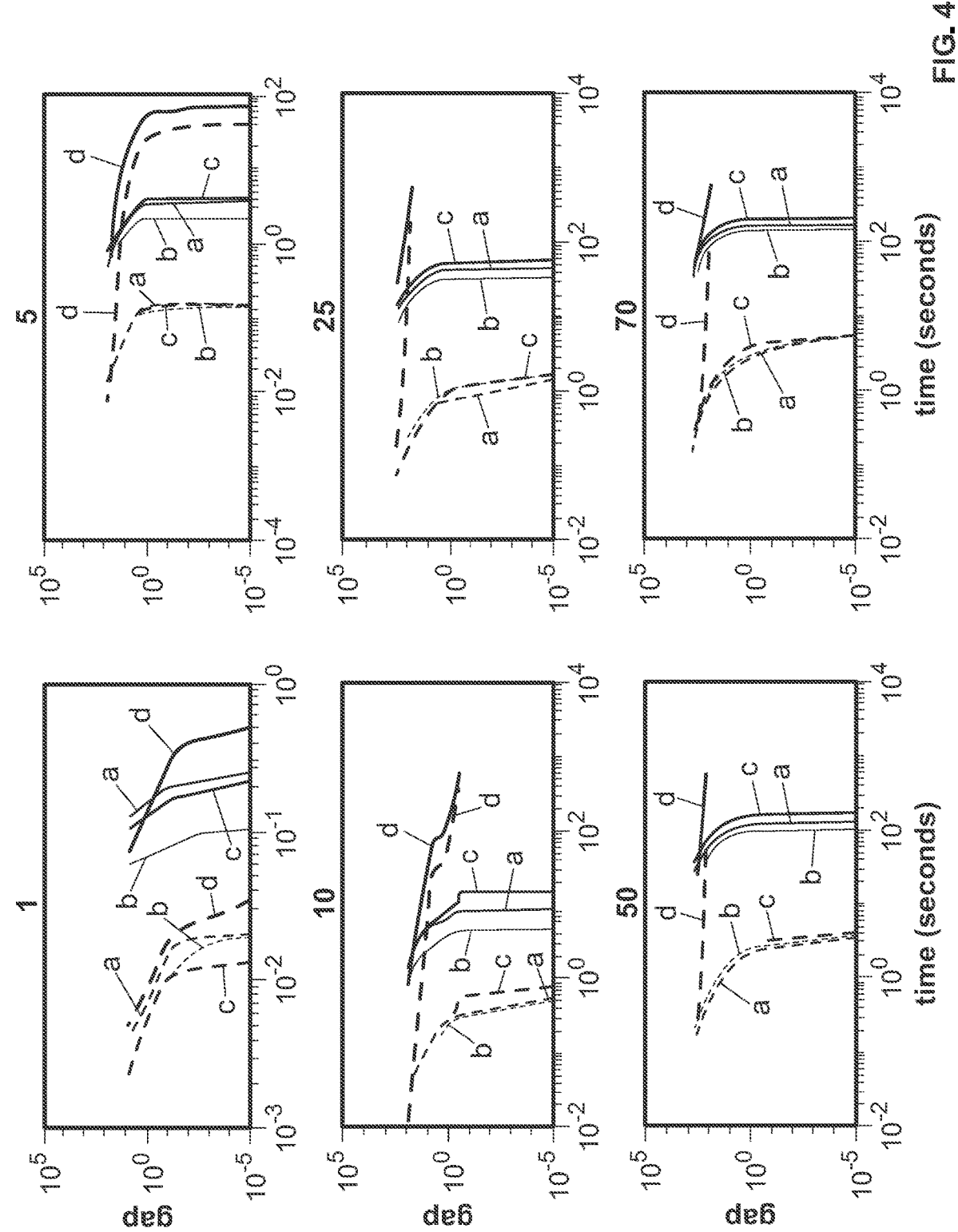
FIG. 4 depicts a set of charts demonstrating the effectiveness of the present system with various optimal parameters for different problem difficulties.

FIG. 4 depicts a set of charts demonstrating the effectiveness of the present system with various optimal parameter v for different problem difficulties. Specifically, the gap is plotted between the upper and lower bounds as a function of time for various values of v on selected problem instances. The symbols a, b, and c indicate v=[0.5, 0.99, 0.01], respectively, and the symbol d indicates not using Magnanti-Wong rows ("MWR"). Further, both the computation time with and without exploiting parallelization of subproblems is shown, with dotted and solid lines, respectively. Titles are used to indicate the approximate difficulty of the problem as ranked by input file size of 100 files.

In FIG. 4, it is observed that the system's use of MWR dramatically accelerates optimization. However, the exact value of optimal parameter v does not affect the speed of optimization dramatically. Performance is shown with and without relying on parallel processing. The parallel processing times assume that one CPU is used for each subproblem. For the problem instances during the testing, the number of subproblems is under one thousand. The parallel and non-parallel time comparisons share only the time to solve the master problem. Large benefits of parallelization are observed for all settings of v. However, when MWR are not used, diminished improvement is observed, since the master problem consumes a larger proportion of total CPU time.

Figure 5:
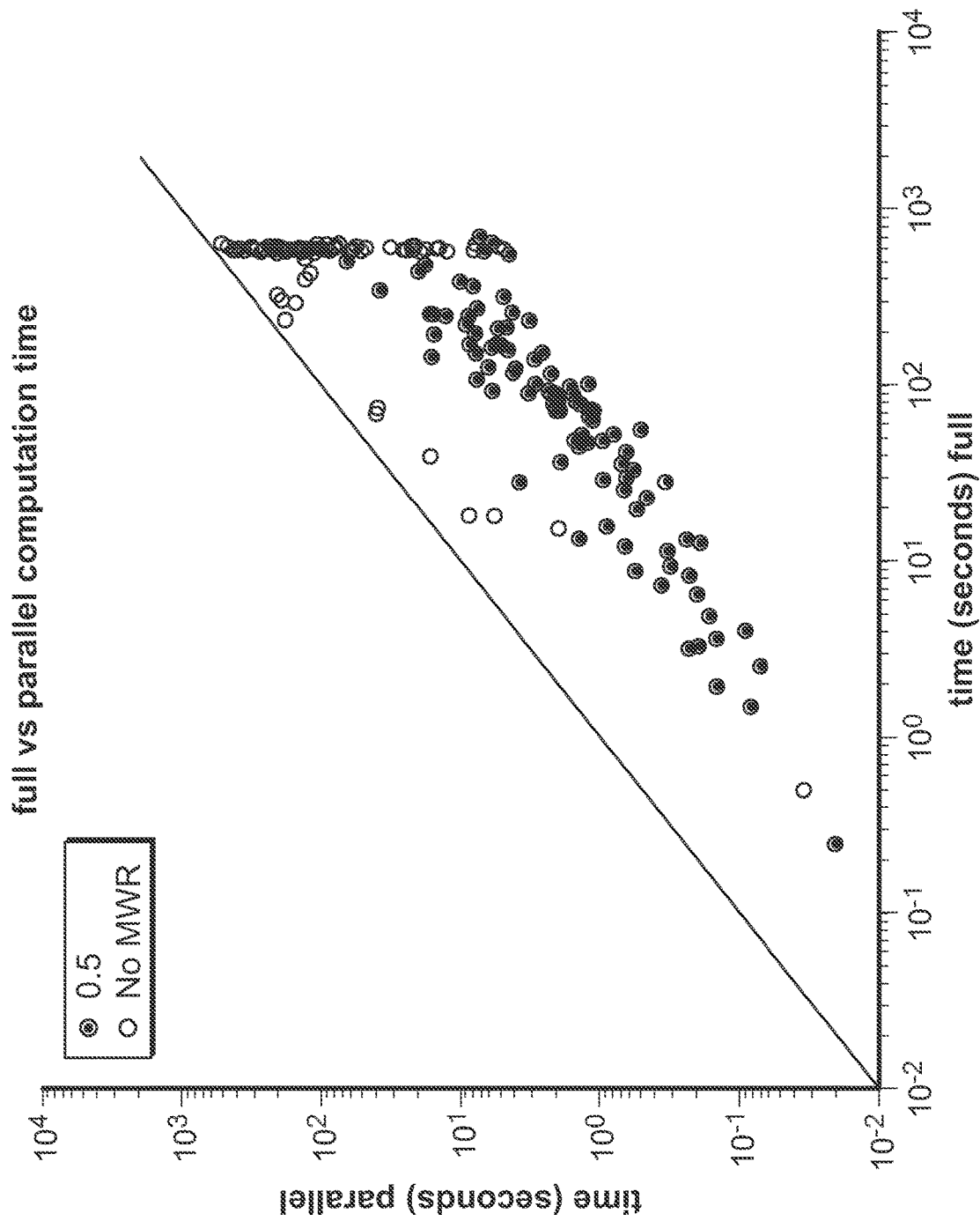
FIG. 5 is a graph illustrating speed increase resulting from the use of parallelization by the system of the present disclosure.

FIG. 5 is a graph showing the use of parallelization. Specifically, the benefits of parallelization and MWR across the data set are compared. Scatter plotted is the total running time versus the total running time when solving each subproblem is done on its own CPU across problem instances. Grey circles indicate v=0.5 and black circles are used to indicate when MWR was not used. A line is drawn with slope=1 to better enable appreciation of the grey and black points.

FIG. 6 is a table showing the convergence of the bounds for v=½, 0; (v=0 means that no MWR are generated). A percentage is shown of problems solved that have a duality gap of up to tolerance $\in$, within a certain amount of time (10,50,100,300) seconds, with and without MWR/parallelization. Par=1 is used to indicate the use of parallelization and par=0 is used to indicate without parallelization. Further, v=0 means that no MWRs are generated. A set of tolerances is considered on convergence regarding the duality gap, which is the difference between the anytime solution (upper bound), and the lower bound on the objective. For each such tolerance f, the present system computes the percentage of instances, for which the duality gap is less than f, after various amounts of time. It is observed that the performance of optimization without MWR, but exploiting parallelization, performs worse than using MWR, but without parallelization. This demonstrates that, across the data set, MWR is of greater importance than parallelization.

The following demonstrates a proof that there exists an x that minimizes Equation 3, for which $Q(\phi, n, x)=0$. The proof maps an arbitrary solution $(x, \{x^n \forall n \in N\})$ to one denoted $(x, \{x^{n*} \forall n \in N\})$ where $Q(\phi, n, x^*)=0$, without increasing the objective in Equation 3. Equation 14, below, is written in terms of $x^n$:

$$x^*_{d_1 d_2} \leftarrow x_{d_1 d_2} + \max_{n \in N} x^n_{d_1 d_2} \quad \forall (d_1, d_2) \in \varepsilon^+ \qquad \text{Equation 14}$$

$$x^*_{d_1 d_2} \leftarrow x_{d_1 d_2} + x^n_{d_1 d_2} - 1 \quad \forall (d_1, d_2) \in \varepsilon^-_n, n \in N$$

-continued $$x^{n*}_{d_1 d_2} \leftarrow 0 \quad \forall (d_1, d_2) \in \varepsilon^+$$

$$x^{n*}_{d_1 d_2} \leftarrow 1 \quad \forall (d_1, d_2) \in \varepsilon^-_n, n \in N$$

The updates in Equation 14 are equivalent to the following updates, in Equation 15, below, using f', f'', where f', f''* correspond to the optimizing solution for f in subproblem n, given x, x* respectively.

$$x^*_{d_1 d_2} \leftarrow x_{d_1 d_2} + \max_{n \in N} f^n_{d_1 d_2} \quad \forall (d_1, d_2) \in \varepsilon^+ \qquad \text{Equation 15}$$

$$x^*_{d_1 d_2} \leftarrow x_{d_1 d_2} - f^n_{d_1 d_2} \quad \forall (d_1, d_2) \in \varepsilon^-_n, n \in N$$

$$f^{n*}_{d_1 d_2} \leftarrow 0 \quad \forall (d_1, d_2) \in \varepsilon^+$$

$$f^{n*}_{d_1 d_2} \leftarrow 0 \quad \forall (d_1, d_2) \in \varepsilon^-_n$$

It is noted that the updates in Equations 14 and 15 preserve the feasibility of the primal LP in Equation 6. It is further noted that since $f^{n*}$ is a zero valued vector for all $n \in N$, then $Q(\phi, n, x)=0$ for all $n \in N$.

The total change in Equation 3 corresponding to edge $(d_1, d_2) \in \varepsilon^+$, induced by Equation 14, is non-positive. The objective of the master problem increases by $\phi_{d_1 d_2} \max_{n \in N} x^n_{d_1 d_2}$, while the total decrease in the objectives of the subproblems is $\phi_{d_1 d_2} \Sigma_{n \in N} x^n_{d_1 d_2}$. Next, the total change in Equation 3 is considered corresponding to edge $(d_1, d_2) \in \varepsilon^n$, induced by Equation 14, which is zero. The objective of the master problem increases by $-\phi_{d_1 d_2}(1-x^n_{d_1 d_2})$, while objective of subproblem n decreases by $-\phi_{d_1 d_2}(1-x^n_{d_1 d_2})$.

The approach for producing feasible integer solutions will now be discussed. Prior to the termination of optimization, it can be valuable to provide feasible integer solutions on demand. This is so that a user can terminate optimization, when the gap between the objectives of the integral solution and the relaxation is small. The production of feasible integer solutions is considered, given the current solution x* to the master problem, which may neither obey cycle inequalities or be integral. This procedure is referred to as rounding.

Rounding is a coordinate descent approach defined on the graph $\varepsilon$ with weights κ, determined using x* as seen in Equation 16, below:

$$\kappa_{d_1 d_2} = \phi_{d_1 d_2}(1-x^*_{d_1 d_2}) \quad \forall (d_1, d_2) \in \varepsilon^+$$

$$\kappa_{d_1 d_2} = \phi_{d_1 d_2} x^*_{d_1 d_2} \quad \forall (d_1, d_2) \in \varepsilon^- \qquad \text{Equation 16}$$

It is considered that x* is integral and feasible (where feasibility indicates that x* satisfies all cycle inequalities). Let $x^{n*}$ define the boundaries, in partition x*, of the connected component containing n. Here, $x^{n*}_{d_1 d_2}=1$ if one of $d_1$, $d_2$ is in the connected component containing n under cut x*. It is observed that $Q(\kappa, n, x^{n0})=0$, where $x^{0n}_{d_1 d_2}=[(d_1, d_2) \in \varepsilon_n^-]$, is achieved using $x^{n*}$ as the solution to Equation 6. Thus $x^{n*}$ is the minimizer of Equation 6. The union of the edges cut in $x^{n*}$ across $n \in N$ is identical to x*. It is observed that when x* is integral, and feasible, then a solution is produced that has cost equal to that of x*, as seen below in Equation 17:

$$x^{n*} \leftarrow \text{minimizer of } Q(\kappa, n, x^{0n}) \; \forall n \in \mathcal{N} \quad \text{Equation 17}$$

$$x^+_{d_1 d_2} \leftarrow \max_{n \in \mathcal{N}} x^{n*}_{d_1 d_2} \quad \forall (d_1, d_2) \in \varepsilon^+$$

$$x^+_{d_1 d_2} \leftarrow x^{n*}_{d_1 d_2} \quad \forall (d_1, d_2) \in \varepsilon^-_n, n \in \mathcal{N}$$

The procedure of Equation 17, can be used regardless of whether x* is integral or feasible. It is observed that if x* is close to integral and close to feasible, then Equation 17 is biased to produce a solution that is similar to x* by design of κ.

A serial version of Equation 17 will now be discussed, which can provide improved results. A partition $x^+$ is constructed by iterating over n∈N, producing component partitions as in Equation 17. The term κ is altered by allowing for the cutting of edges previously cut with cost zero. FIG. 7 is an illustration of an algorithm showing the serial rounding procedure. In Line 1, the system initialize $x^+$ as the zero vector. In lines 2-3, the system set x according to Equation 16. In line 4-8, the system, iterates over n∈N to construct $x^+$ by cutting edges cut in the subproblem. Specifically, in line 5, the system produces the lowest cost cut $x^n$ given altered edge weights κ for subproblem n. In line 6, the system cuts edges in $x^+$ that are cut in $x^n$. In line 7, the system sets $\phi_{d_1 d_2}$ to zero for cut edges in $x^+$. In line 9, the system returns the solution $x^+$. When solving for the fast minimizer of $Q(\kappa, n, x^{0n})$, the system relies on a network flow solver.

Figure 8:
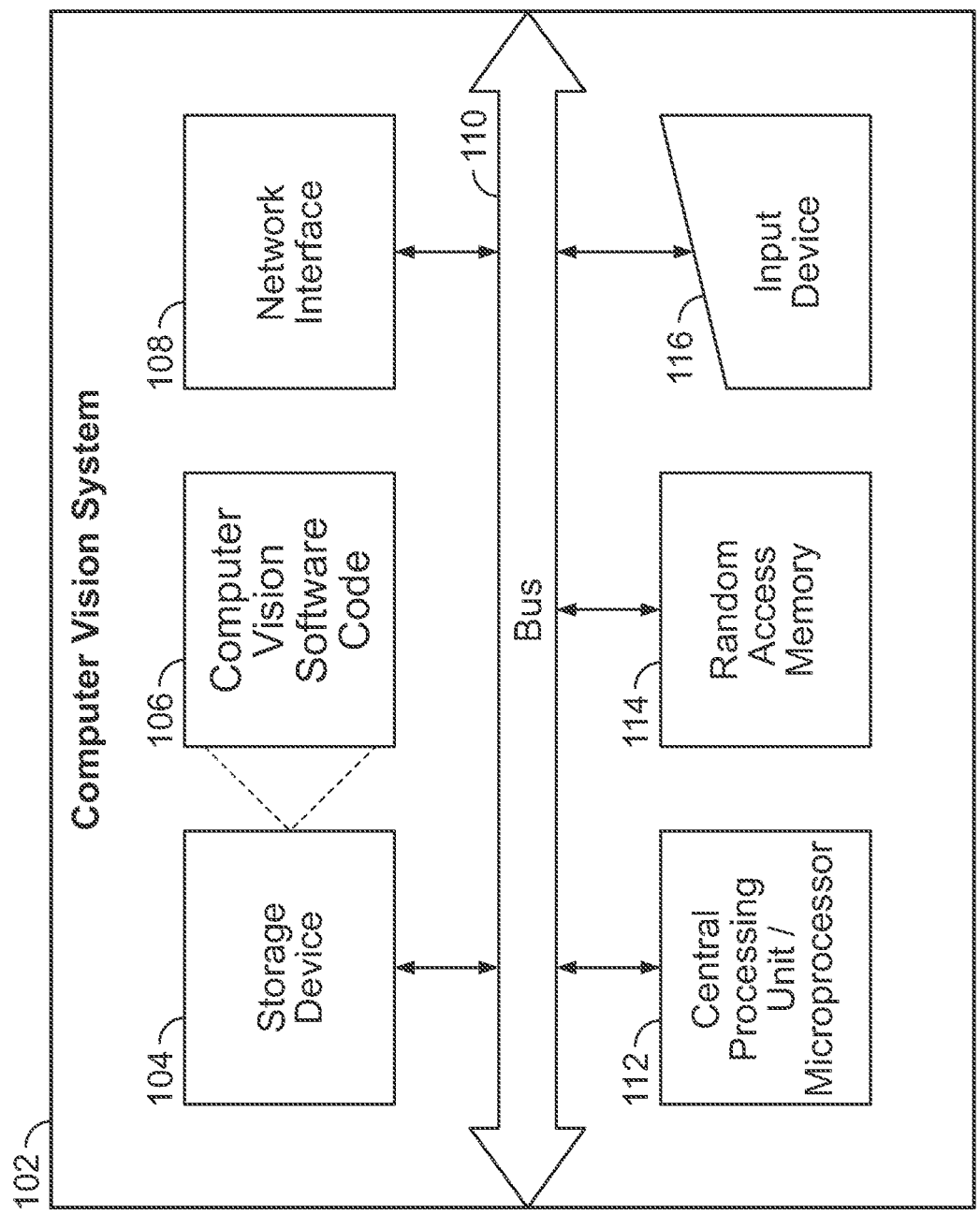
FIG. 8 is a diagram illustrating sample hardware and software components capable of being used to implement the system of the present disclosure.

FIG. 8 is a diagram showing a hardware and software components of a computer system 102 on which the system of the present disclosure can be implemented. The computer system 102 can include a storage device 104, computer vision software code 106, a network interface 108, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The computer system 102 could be a networked computer system, a personal computer, a server, a smart phone, tablet computer etc. It is noted that the server 102 need not be a networked server, and indeed, could be a stand-alone computer system.

The functionality provided by the present disclosure could be provided by computer vision software code 106, which could be embodied as computer-readable program code stored on the storage device 104 and executed by the CPU 112 using any suitable, high or low level computing language, such as Python, Java, C, C++, C #, .NET, MATLAB, etc. The network interface 108 could include an Ethernet network interface device, a wireless network interface device, or any other suitable device which permits the server 102 to communicate via the network. The CPU 112 could include any suitable single-core or multiple-core microprocessor of any suitable architecture that is capable of implementing and running the computer vision software code 106 (e.g., Intel processor). The random access memory 114 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A computer vision system for optimizing correlation clustering comprising:
a memory; and
a processor in communication with the memory, the processor:
receiving input data,
generating a correlation clustering formulation for Benders Decomposition for optimized correlation clustering of the input data,
optimizing the Benders Decomposition for the generated correlation clustering formulation, and
performing image segmentation using the optimized Benders Decomposition.

2. The system of claim 1, wherein the processor generates the correlation clustering formulation to utilize Benders Decomposition by:
applying an auxiliary function to a conventional correlation clustering formulation, the auxiliary function being indicative of a cost to alter a vector of the auxiliary function to satisfy cycle inequalities, and
mapping the altered vector to a solution that satisfies the cycle inequalities without increasing a cost of the auxiliary function.

3. The system of claim 1, wherein the processor optimizes the Benders Decomposition via a cutting plane algorithm.

4. The system of claim 3, wherein the Benders Decomposition includes a master problem and a set of subproblems and the cutting plane algorithm executes optimization over the variables of the master problem and then executes optimization over the subproblems in parallel.

5. The system of claim 1, wherein the processor accelerates the Bender Decomposition utilizing Benders rows and Magnanti-Wong Benders rows.

6. The system of claim 1, wherein the dataset is a Berkeley Segmentation Data Set (BSDS).

7. A method for optimizing correlation clustering by a computer vision system, comprising the steps of:
receiving input data;
generating a correlation clustering formulation for Benders Decomposition for optimized correlation clustering of the input data;
optimizing the Benders Decomposition for the generated correlation clustering formulation; and
performing image segmentation using the optimized Benders Decomposition.

8. The method of claim 7, further comprising the steps of generating the correlation clustering formulation to utilize Benders Decomposition by:
applying an auxiliary function to a conventional correlation clustering formulation, the auxiliary function being indicative of a cost to alter a vector of the auxiliary function to satisfy cycle inequalities; and
mapping the altered vector to a solution that satisfies the cycle inequalities without increasing a cost of the auxiliary function.

9. The method of claim 7, further comprising the step of optimizing the Benders Decomposition via a cutting plane algorithm.

10. The method of claim 9, wherein the Benders Decomposition includes a master problem and a set of subproblems and the cutting plane algorithm executes optimization over the variables of the master problem and then executes optimization over the subproblems in parallel.

11. The method of claim 7, further comprising the step of accelerating the Bender Decomposition utilizing Benders rows and Magnanti-Wong Benders rows.

12. The method of claim 7, wherein the dataset is a Berkeley Segmentation Data Set (BSDS).

13. A non-transitory computer readable medium having instructions stored thereon for optimizing correlation clustering by a computer vision system which, when executed by a processor, causes the processor to carry out the steps of:
receiving input data;
generating a correlation clustering formulation for Benders Decomposition for optimized correlation clustering of the input data;
optimizing the Benders Decomposition for the generated correlation clustering formulation; and
performing image segmentation using the optimized Benders Decomposition.

14. The non-transitory computer readable medium of claim 13, the processor further carrying out the steps of generating the correlation clustering formulation to utilize Benders Decomposition by:
applying an auxiliary function to a conventional correlation clustering formulation, the auxiliary function being indicative of a cost to alter a vector of the auxiliary function to satisfy cycle inequalities; and
mapping the altered vector to a solution that satisfies the cycle inequalities without increasing a cost of the auxiliary function.

15. The non-transitory computer readable medium of claim 13, the processor further carrying out the step of optimizing the Benders Decomposition via a cutting plane algorithm.

16. The non-transitory computer readable medium of claim 15, wherein the Benders Decomposition includes a master problem and a set of subproblems and the cutting plane algorithm executes optimization over the variables of the master problem and then executes optimization over the subproblems in parallel.

17. The non-transitory computer readable medium of claim 13, the processor further carrying out the step of accelerating the Bender Decomposition utilizing Benders rows and Magnanti-Wong Benders rows.

18. The non-transitory computer readable medium of claim 13, wherein the dataset is a Berkeley Segmentation Data Set (BSDS).

* * * * *

UNITED STATES PATENT AND TRADEMARK OFFICE
CERTIFICATE OF CORRECTION

PATENT NO. : 11,636,607 B2
APPLICATION NO. : 17/132169
DATED : April 25, 2023
INVENTOR(S) : Singh et al.

Page 1 of 1

It is certified that error appears in the above-identified patent and that said Letters Patent is hereby corrected as shown below:

On the Title Page

Under the Inventors, Maneesh Kumar Singh's residential information, namely, "Lawrenceville, NJ (US)," should be deleted and replaced with "Princeton, NJ (US)"

On page 3, under the References Cited Other Publications Column, the fifth reference down the first column, the word "col." should be deleted and replaced with the word "Column"

Signed and Sealed this
Twenty-seventh Day of June, 2023

Katherine Kelly Vidal
*Director of the United States Patent and Trademark Office*